US007012862B2

(12) United States Patent
Hiratsuka

(10) Patent No.: US 7,012,862 B2
(45) Date of Patent: Mar. 14, 2006

(54) TRACKING ERROR DETECTION APPARATUS

(75) Inventor: Takashige Hiratsuka, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 380 days.

(21) Appl. No.: 10/196,382

(22) Filed: Jul. 17, 2002

(65) Prior Publication Data

US 2003/0016600 A1    Jan. 23, 2003

(30) Foreign Application Priority Data

Jul. 18, 2001  (JP)  ............................. 2001-218519

(51) Int. Cl.
    *G11B 7/095*  (2006.01)
(52) U.S. Cl. .................. 369/44.34; 369/44.41
(58) Field of Classification Search ............ 369/44.34,
    369/44.11, 53.28, 44.25, 44.27, 47.28, 47.49
    See application file for complete search history.

(56) References Cited

U.S. PATENT DOCUMENTS

| | | | | | |
|---|---|---|---|---|---|
| 4,190,859 | A | * | 2/1980 | Kinjo ........................... | 369/43 |
| 4,386,300 | A | * | 5/1983 | Ogawa ......................... | 388/820 |
| 4,495,474 | A | * | 1/1985 | Nishikawa et al. ............ | 331/11 |
| 4,872,155 | A | * | 10/1989 | Yokogawa et al. ........ | 369/47.28 |
| 5,278,814 | A | * | 1/1994 | Deguchi et al. .......... | 369/47.49 |
| 5,764,609 | A | | 6/1998 | Araki et al. | |
| 5,835,461 | A | * | 11/1998 | Kobayashi et al. ....... | 369/47.28 |
| 6,205,095 | B1 | * | 3/2001 | Hisakado et al. ........ | 369/47.25 |
| 6,215,742 | B1 | * | 4/2001 | Kuroda et al. ........... | 369/47.28 |
| 6,236,628 | B1 | * | 5/2001 | Kim ........................... | 369/44.41 |
| 6,269,059 | B1 | * | 7/2001 | Kuroda et al. ........... | 369/47.28 |
| 6,542,039 | B1 | * | 4/2003 | Ogura ......................... | 331/11 |
| 6,741,533 | B1 | | 5/2004 | Hiratsuka et al. | |

FOREIGN PATENT DOCUMENTS

| | | |
|---|---|---|
| JP | 1-220230 | 9/1989 |
| JP | 8-293155 | 11/1996 |
| JP | 10-162381 | 6/1998 |
| JP | 11-025486 | 1/1999 |
| JP | 11-328691 | 11/1999 |
| JP | 11-345456 | 12/1999 |
| JP | 2001-67690 | 3/2001 |
| JP | 3274812 | 2/2002 |

* cited by examiner

*Primary Examiner*—Brian E. Miller
*Assistant Examiner*—Peter Vincent Agustin
(74) *Attorney, Agent, or Firm*—Wenderoth, Lind & Ponack, L.L.P.

(57) ABSTRACT

A tracking error detection apparatus includes a phase error detection unit for detecting a phase error of an output signal according to the amount of reflected light that is obtained when a light beam is applied to an information recording medium and a low-band pass unit for performing band restriction to obtain a tracking error signal from the phase error signal. The tracking error detection apparatus also includes a clock generation unit for generating a clock and a clock control unit having a frequency divider for generating a frequency-divided clock of the clock that is generated by the clock generation unit, wherein the clock control unit uses the frequency-divided clock as an operation clock for the tracking error detection apparatus. Therefore, the operation rate of each unit when generating a tracking error signal can be reduced, whereby a reduction in power consumption is achieved.

5 Claims, 12 Drawing Sheets

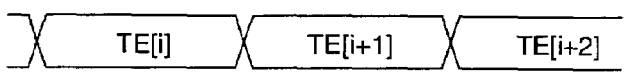
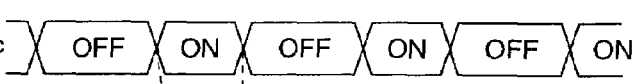
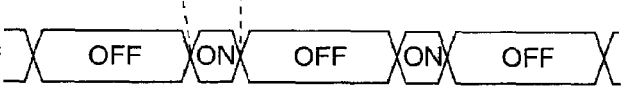
Fig.5 Prior Art
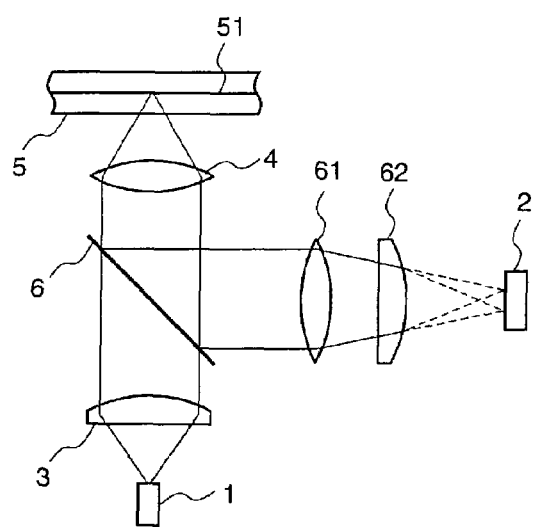

Prior Art
Fig.6(a)    Fig.6(b)    Fig.6(c)
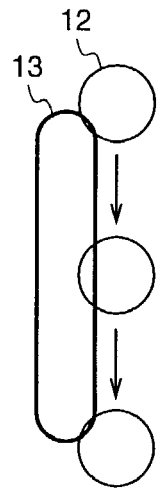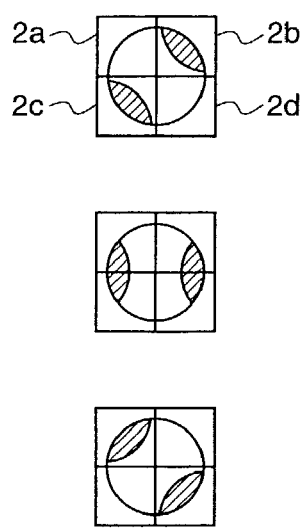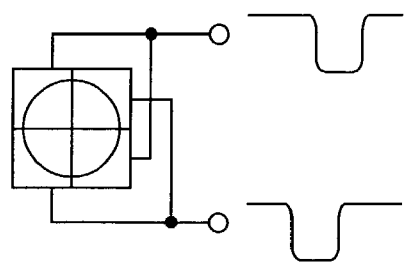
Prior Art
Fig.7(a)    Fig.7(b)    Fig.7(c)
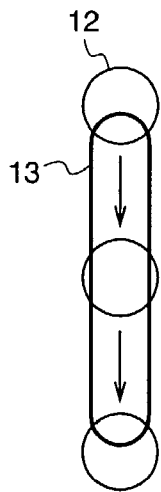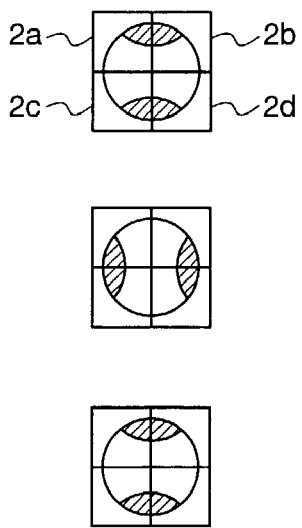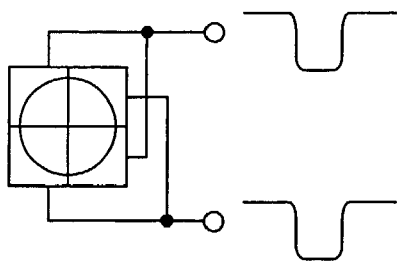

Prior Art
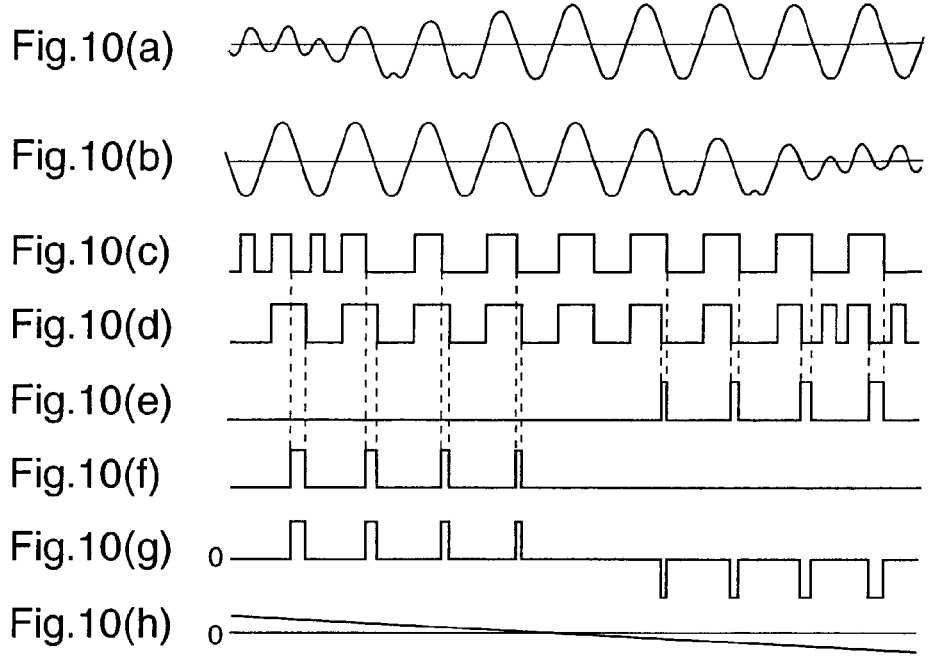
Fig.10(a)
Fig.10(b)
Fig.10(c)
Fig.10(d)
Fig.10(e)
Fig.10(f)
Fig.10(g)
Fig.10(h)
Prior Art
Fig.11
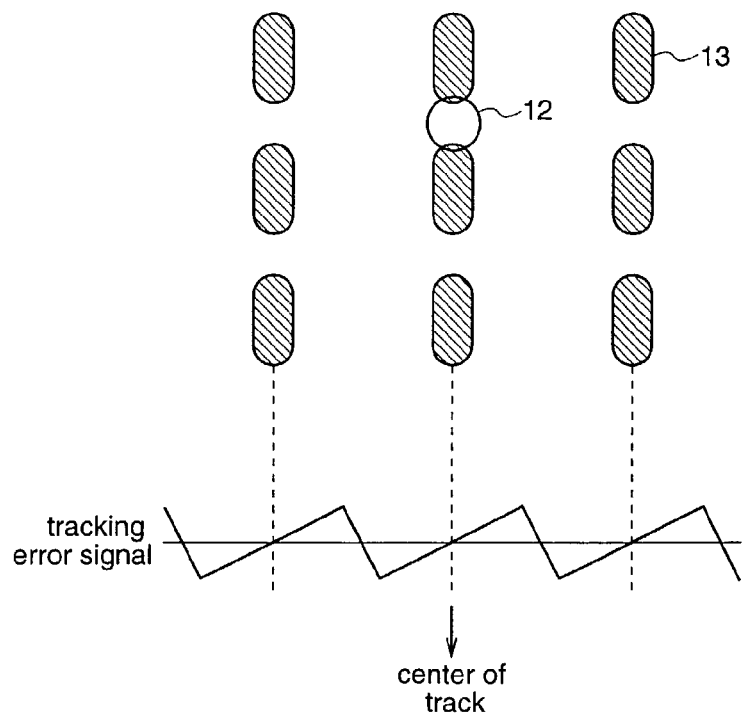

TRACKING ERROR DETECTION APPARATUS

FIELD OF THE INVENTION

The present invention relates to an optical recording/reproduction apparatus for optically recording or reproducing information on/from an information storage medium, and a tracking error detection apparatus included in an optical pickup.

BACKGROUND OF THE INVENTION

In recent years, there has been employed a phase difference detection method as a method for obtaining a tracking control signal from an optical disc on which information is recorded by concave and convex pits, as typified by a CD (Compact Disc) and a DVD (Digital Video Disc).

This method utilizes a phenomenon in which, when a light spot applied to an information recording surface of an optical disc passes over an information pit, an image (diffraction pattern) of the information pit on a photoreceptor changes due to a deviation of the light spot from the center of the information pit. To be specific, the photoreceptor is divided into plural elements in the direction along the track length of the image of the information pit, and an output signal level according to the amount of incident light to each photoreceptor element is observed. At this time, the change in the image of the information pit varies according to the direction and amount of deviation of the light spot from the center of the information pit, and the output signals from the respective photoreceptor elements are binarized at a predetermined level and then a difference in phases between the binarized signals is detected, thereby obtaining a tracking error signal that indicates the direction and amount of deviation of the light spot.

FIG. 5 is a block diagram illustrating the construction of an optical pickup for generating a tracking error signal by detecting a phase difference.

Hereinafter, a conventional method for generating a tracking control signal will be described with reference to FIG. 5.

FIG. 5 shows an example of an optical pickup employing a photoreceptor that is divided into four equal parts, and an astigmatism method for detecting a focus error signal. In FIG. 5, a light beam emitted from a light source 1, such as a semiconductor laser, is converted into a parallel light beam by a collimator lens 3. Thereafter, the parallel light beam travels through a half mirror 6, and is converged by an objective lens 4 to be applied, as a fine light spot, onto an information recording surface 51 of an information recording medium (optical disc) 5. A reflected light beam from the optical disc 5 travels through the objective lens 4, is turned to right in the figure by the half mirror 6, and travels through a convex lens 61 and a cylindrical lens 62 to be a converged light beam having two focuses which is a feature of the astigmatism method, and finally, reaches a photoreceptor 2.

When information is recorded by an information pit string having projections and depressions on the recording medium (optical disc 5), it is possible to obtain a tracking error signal which indicates a positional error between the light spot and the pit string (track) in the direction perpendicular to the track within the information recording surface.

Each of FIGS. 6(a)–(c), 7(a)–(c), and 8(a)–(c) shows the positional relationship between a light spot 12 and an information pit 13 when the light spot 12 passes over the pit 13 (6(a),7(a),8(a)), a change in an intensity distribution pattern (far field pattern) of the amount of reflected light on the photoreceptor 2 (6(b),7(b),8(b)), and a signal obtained from the photoreceptor 2 (6(c),7(c),8(c)).

When the light spot 12 passes over the information pit 13, the far field pattern of the amount of reflected light changes timewise. When the light spot 12 passes along the center of the information pit 13 (i.e., the center of the track) as shown in FIGS. 7(a)–(c), the far field pattern changes symmetrically. When the light spot 12 passes along the left side of the information pit 13 as shown in FIGS. 6(a)–(c), the far field pattern changes so as to rotate clockwise. When the light spot 12 passes along the right side of the information pit 13 as shown in FIGS. 8(a)–(c), the far field pattern changes so as to rotate counterclockwise. This rotating change of the far field pattern becomes sharper as the light spot 12 deviates more from the center of the information pin 13. The phase difference detection method utilizes the change of the far field pattern to detect a tracking error signal.

As shown in FIGS. 6(a) to 8(c), the photoreceptor 2 is divided into four elements 2a, 2b, 2c, and 2d, and a photoelectric current output according to the amount of incident light to each photoreceptor element is converted into a voltage signal by a current-to-voltage converter. By comparing the phases of sum signals each obtained from two photoreceptor elements that are diagonally placed, a positional error between the light spot 12 and the track 13 can be detected from the amount of advance or delay of the phase.

FIG. 9 is a block diagram illustrating an example of a signal processing circuit for detecting a phase difference, and FIGS. 10(a)–(h) illustrates signal waveforms outputted from the respective components of the signal processing circuit.

FIGS. 10(a)–(h) show a situation where the light spot 12 passes over the information pit (track) 13 from left to right with the passage of time, that is, the light spot 12 passes over the information pit 13 while changing from the state shown in FIGS. 6(a)–(c) to the state shown in FIGS. 8(a)–(c).

In FIG. 9, photoelectric current outputs, which have been detected by the photoreceptor elements 2a, 2b, 2c, and 2d into which the photoreceptor 2 is divided, are subjected to current-to-voltage conversion by current-to-voltage converters 7a, 7b, 7c, and 7d, respectively. Thereafter, the outputs from the current-to-voltage converters 7a and 7c are added by an adder 8a, and the outputs from the current-to-voltage converters 7b and 7d are added by an adder 8b. In this way, two signals obtained from the diagonally placed photoreceptor elements are added. The sum signals, each obtained by adding the signals from the diagonally placed photoreceptor elements, have waveforms shown by FIGS. 10(a) and 10(b), respectively, and these signals are transmitted through binarization circuits 9a and 9b to obtain signals shown in FIGS. 10(c) and 10(d), respectively. The above-mentioned tracking error signal can be obtained by detecting a phase difference between these signals at the rising or falling edges. In the circuit structure shown in FIG. 9, a phase difference at the falling edges is detected using D type flip-flops (D-FF) 101a and 101b. Thereafter, detected time difference pulses (e) and (f) are converted into a pulse width modulated signal (g) by a differential detector 102, and the signal (g) is filtered by a low-pass filter 11 to obtain an analog tracking error signal (h).

In each D-FF, a terminal marked with a circle and indicated by "T" is a clock input terminal, and a terminal marked with a circle and indicated by "R" is a reset input terminal. When the reset terminal "R" is at a logic "L" level, an output from a "Q" terminal is unconditionally at the "L" level, and when the reset terminal "R" is at a logic "H" level, a logic level equal to that given to an input terminal "D" is outputted to the "Q" terminal at the falling of the "T" (clock) terminal from "H" to "L".

As shown in FIG. 10(h), when the light spot is placed in the center of a specific track, a tracking error signal obtained by using the signal processing circuit becomes zero level, and when the light spot is shifted to left or right from the center, the tracking error signal becomes an approximately linear signal having a polarity according to the shift direction. When the light spot is observed over plural tracks, the approximately linear signal appears for every track, and further, the signal becomes zero level when the light spot is placed between adjacent tracks, resulting in a sawtooth shape waveform in which the tracking error signal is repeated for every track, as shown in FIG. 11.

In order to perform tracking servo control by using the tracking error signals having the sawtooth shape waveform as shown in FIG. 11, a tracking servo control system should be constructed such that the objective lens 4 is driven by a means that is generally called a tracking actuator, according to the signs (plus/minus) of the tracking error signals.

In the above-described tracking error detection method, since the tracking error signals are detected using analog signal processing, optimization by redesign must be carried out to cope with speedup of the optical recording/reproduction apparatus and an increase in the recording density on the optical disc. For example, when the recording density on the optical disc is increased, a high-frequency component of a read signal obtained from the photoreceptor is undesirably attenuated, and a phase error signal cannot be correctly detected. FIG. 12 shows a solution of this problem. In FIG. 12, the sum signals, each obtained by adding the two signals outputted from the diagonally-placed photoreceptor elements by the adder 8a (8b), are subjected to high-band emphasis by waveform equalization filters 15a and 15b, and then binarized by binarization circuits 9a and 9b, respectively, to obtain phase error signals, whereby the degradation of the high-frequency component due to an increase in the recording density can be compensated. When the waveform equalization filters 15a and 15b are constituted by analog FIR (Finite Impulse Response) filters, all-pass filters are required for constituting delay parts of the FIR filters.

However, when the processing speed of the optical recording/reproduction apparatus is increased, since the channel rate of the read data varies, the required amount of delay varies significantly, and therefore, optimization of the delay circuit must be carried out. Further, since the required high-band emphasis characteristics also vary as the recording density varies, optimization according to an increase in the recording density is also needed. As described above, in the conventional tracking error detection method using analog signal processing, it is difficult to cope with speedup of the optical recording/reproduction apparatus or an increase in the recording density on the optical disc. Further, since the conventional tracking error detection apparatus includes many processing units for analog signal processing, it is not suited to be integrated with neighboring digital signal processing units.

In order to solve the above-described problems, there is proposed a tracking error detection circuit employing digital signal processing. FIG. 13 is a block diagram illustrating an example of a tracking error detection circuit employing digital signal processing.

With reference to FIG. 13, a reflected light beam, which is obtained by applying a light spot on a track of an information recording medium, is received by a photoreceptor 2 that is divided into four elements 2a, 2b, 2c, and 2d, and a photoelectric current output according to the amount of incident light onto each of the photoreceptor elements 2a, 2b, 2c, and 2d is obtained. The photoelectric current outputs so obtained are converted into voltage signals by current-to-voltage converters 7a, 7b, 7c, and 7d, respectively. Thereafter, the outputs from the current-to-voltage converters 7a and 7c are added by an adder 8a, and the outputs from the current-to-voltage converters 7b and 7d are added by an adder 8b. In this way, the two signals obtained from the diagonally-placed photoreceptor elements are added, thereby obtaining two sum signals for performing phase comparison. The two sum signals so obtained are digitized by analog-to-digital converter (ADC) 16a and 16b, respectively. Next, two sequences of sampling data obtained by the respective ADCs 16a and 16b are filtered by interpolation filters 17a and 17b to obtain interpolation data among the sampling data. For example, as an interpolation method, a method of obtaining data by Nyquist interpolation using a digital FIR filter may be employed. When using, as tap coefficients of this digital FIR filter, coefficients obtained by incorporating coefficients for performing data interpolation and coefficients having high-frequency emphasis characteristics, one digital FIR filter can have two functions of data interpolation and high-frequency emphasis. Next, zero cross points at the rising or falling edges of the interpolated two data sequences are detected by zero cross point detectors 18a and 18b, respectively. For example, as a method for detecting zero cross points, a method of detecting a change point of the sign (+→−, or −→+) in each interpolated data sequence may be employed. Next, a phase error detector 19 detects a phase difference from the distance between the corresponding zero cross points in the waveforms of the two data sequences, and outputs a phase error signal. The operation of the phase error detector 19 will be later described. Finally, the phase error signal so obtained is subjected to band restriction by a low-pass filter (LPF) 11, thereby obtaining a tracking error signal.

Hereinafter, the operation of the phase error detector 19 will be described with reference to FIGS. 14(a)–14(c).

FIGS. 14(a) and 14(b) show two data sequences for obtaining a phase difference, and FIG. 14(c) shows a phase error signal obtained by the phase error detector 19. In FIGS. 14(a) and 14(b), white circles (○) indicate sampling data obtained by the ACDs 16a and 16b, white triangles (△) indicate interpolation data obtained from the sampling data sequence by the interpolation filters 17a and 17b, and black circles (●) and black triangles (▲) indicate zero cross points obtained from the sampling data sequence and the interpolation data sequence. The phase error signal shown in FIG. 14(c) is obtained from a specific single track and its vicinity, at the falling edges of the two data sequences. Further, the number of interpolation data is n=3.

When comparing the zero cross points shown in FIG. 14(a) and the zero cross points shown in FIG. 14(b), the amount of the phase difference between the two waveforms is in proportion to the distance between the corresponding zero cross points in the two waveforms. The direction of phase shift can be obtained by judging which one of the zero cross points of the two waveforms is the first to cross the zero level. The phase error signal shown in FIG. 14(c) is obtained from the amount of phase difference and the direction of phase shift which are thus obtained.

The obtained phase error signal is an approximately linear signal when attention is given to a specific single track and its vicinity. When it is observed over plural tracks, an approximately sawtooth-shape waveform in which the phase error signal is repeated for every track, is obtained as shown in FIG. 11. Finally, the phase error signal is subjected to band restriction by the LPF 11, resulting in a tracking error signal of a frequency band that is required for tracking servo control.

Since the above-described tracking error detection apparatus generates a tracking error signal by using digital signal processing, adjustment in accordance with an increase in the processing speed and an increase in the recording density is facilitated. Further, the signal processing after the ADC can easily be integrated with the neighboring digital signal processing units, resulting in a considerable reduction in the number of processing blocks which are required for analog signal processing.

In the tracking error detection apparatus employing digital signal processing, since the sampling data sequences are subjected to data interpolation to obtain the tracking error signal, the operation of the apparatus significantly varies depending on the frequency of the sampling clock. In the case of CLV (Constant Linear Velocity) reproduction, since reproduction is carried out so that the channel rate in the reproduced waveform becomes constant, stable tracking error signals can be obtained at both of the inner and outer circumferences of the disc by setting the sampling clock of the ADC in the tracking error detection apparatus to a fixed clock corresponding to the channel rate. However, in the case of CAV (Constant Angular Velocity) reproduction, the channel rate of the read waveform varies depending on the position of the pickup. For example, when the pickup is on the inner circumference of the disc, a tracking error signal can be obtained by setting the sampling clock to a fixed clock corresponding to the channel rate at this position. However, when the pickup moves toward the outer circumference of the disc, since the channel rate becomes higher than that at the inner circumference while the sampling clock is the fixed clock corresponding to the inner circumference, the interval of sampling performed on the read data is undesirably increased. In the tracking error detection apparatus employing digital signal processing, since the tracking error signal is obtained from the point number of interpolation data which are obtaining by interpolating the sampling data, the interval of the interpolation data is increased relatively to an increase in the sampling interval, whereby the amplitude of the obtained tracking error signal varies undesirably.

In order to solve the above-mentioned problems, there is proposed a method of using, as a sampling clock for CAV reproduction, a read clock that is generated in a read channel unit 20 which reads data from information pits on an information recording medium, as shown in FIG. 15.

FIG. 15 is a block diagram illustrating a read channel unit 20 to be used in a conventional digital system tracking error detection apparatus. In the read channel unit 20, an RF signal to be used for data reading (data reproduction), which is generated by amplifying and modulating a light beam that is reflected at an optical disc and detected by a photoreceptor, is digitized by an ADC 16c, and sampling data thereof are subjected to waveform equalization by a waveform equalization filter 25, and thereafter, data recorded on the optical disc are detected by a binarization circuit 26. In order to perform sampling at an appropriate timing in the ADC 16c, a PLL (Phase Locked Loop) circuit is employed.

In the PLL circuit shown in FIG. 15, a phase comparator 21 obtains a phase error signal from the sampling data of the ADC 16, a loop filter 22 filters the phase error signal, a digital-to-analog converter (DAC) 23 converts the filtered phase error signal into an analog voltage signal, and this analog voltage signal controls the oscillation frequency of a voltage controlled oscillator (VCO) 24. A clock output from the VCO 24 is inputted to the ADC 16 to operate the ADC 16, whereby the clock output serves as a read clock.

When the respective processing units for the above-described tracking error detection employing digital signal processing are operated by using the read clock generated in the read channel unit 20, stable tracking error signals can be generated at both of the inner and outer circumferences of the disc, by using the sampling clocks adaptive to the channel rates at the inner and outer circumferences of the disc.

In the above-described tracking error detection apparatus employing digital signal processing, although the read clock, which is generated in the read channel unit as an operation clock for the tracking error detection apparatus, is used to cope with the CAV reproduction, when the reproduction speed of the drive increases, the read clock also increases in proportion to the reproduction speed, resulting in an increase in power consumption of the tracking error detection apparatus.

SUMMARY OF THE INVENTION

The present invention is made to solve the above-described problems and has for its object to provide a tracking error detection apparatus that can reduce power consumption by lowering the operation rates of the respective processing units when generating a tracking error signal.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a tracking error detection apparatus having a phase error detection means for detecting a phase error of an output signal according to the amount of reflected light that is obtained when a light beam is applied to an information recording medium, and a low-band pass means for performing band restriction to obtain a tracking error signal from the phase error signal, and this apparatus includes: a clock generation means for generating a clock; and a clock control unit having a frequency division means for generating a frequency-divided clock of the clock that is generated by the clock generation means; wherein the clock control unit uses the frequency-divided clock as an operation clock for the tracking error detection apparatus. Therefore, the operation rate of each unit when generating a tracking error signal can be reduced, whereby a reduction in power consumption is realized.

According to a second aspect of the present invention, in the tracking error detection apparatus according to the first aspect, the clock control unit further includes a first clock switching means, and controls the first clock switching means so as to select either the clock that is generated by the clock generation means or the frequency-divided clock of this clock, as an operation clock for the tracking error detection apparatus. Therefore, the original clock (the clock generated by the clock generation means) is used when the arithmetic time required for tracking error detection that causes a loop delay in the tracking servo system is relatively long, while the frequency-divided clock of the original clock is used when the arithmetic time is relatively short, whereby power consumption can be reduced without degrading the tracking servo characteristics.

According to a third aspect of the present invention, in the tracking error detection apparatus according to the second aspect, the clock control unit controls the first clock switching means so as to select either the clock that is generated by the clock generation means or the frequency-divided clock of this clock, according to the rotation speed of the information recording medium. Therefore, the original clock (the clock generated by the clock generation means) is used as the operation clock when the rpm is low, i.e., when the data reading speed of low, while the frequency-divided clock of the original clock is used when the rpm is high, i.e., when the data reading speed is high, whereby power consumption can be reduced without degrading the tracking servo characteristics at every rpm.

According to the fourth aspect of the present invention, in the tracking error detection apparatus according to the second aspect, the clock generation means comprises a read channel unit for reading data from information pits on the information recording medium, and the clock is a read clock that is generated in the read channel unit. Therefore, stable tracking error signals can be generated at both of the inner and outer circumferences of the disc (information recording medium), by using sampling clocks corresponding to channel rates at the inner and outer circumferences of the disc.

According to the fifth aspect of the present invention, in the tracking error detection apparatus according to the fourth aspect, the clock control unit controls the first clock switching means so as to select either the read clock that is generated in the read channel unit, or a frequency-divided clock of the read clock, according to the frequency of the read clock. Therefore, the read clock is used as the operation clock for the tracking error detection apparatus when the frequency of the read clock is low because the arithmetic time required for tracking error detection is increased, while the frequency-divided clock of the read clock is used when the frequency of the read clock is high because the arithmetic time is reduced, whereby power consumption can be reduced without degrading the tracking servo characteristics.

According to a sixth aspect of the present invention, the tracking error detection apparatus according to the first aspect further includes a frequency division means for generating a frequency-divided clock of a clock for phase error detection that is to be supplied to the phase error detection means; wherein the clock control unit controls the clock for phase error detection to be supplied to the phase error detection means, and a clock for low-band pass means to be supplied to the low-band pass means, separately from each other, and supplies the frequency-divided clock of the clock for phase error detection, as the clock for low-band pass means. Therefore, the operation rate of part other than the circuit required for generation of the phase error signal is reduced, whereby power consumption can be further reduced According to a seventh aspect of the present invention, in the tracking error detection apparatus according to the sixth aspect, the clock control unit further includes a second clock switching means, and controls the second clock switching means so as to select either the clock for phase error detection or the frequency-divided clock of this clock, as the clock for low-band pass means. Therefore, the clock for phase error detection is used when the arithmetic time required for tracking error detection that causes a loop delay in the tracking servo system is relatively long, while its frequency-divided clock is used when the arithmetic time is relatively short, whereby power consumption can be reduced without degrading the tracking servo characteristics.

According to an eighth aspect of the present invention, in the tracking error detection apparatus according to the seventh aspect, the clock control unit controls the second clock switching means so as to select either the clock for phase error detection or the frequency-divided clock of this clock, as the clock for low-band pass means, according to the rotation speed of the information recording medium. Therefore, the clock for phase error detection is used as the clock for low-band pass means when the rpm is low, i.e., when the data reading speed of low, while its frequency-divided clock is used when the rpm is high, i.e., when the data reading speed is high, whereby power consumption can be reduced without degrading the tracking servo characteristics.

According to a ninth aspect of the present invention, in the tracking error detection apparatus according to the seventh aspect, the clock generation means comprises a read channel unit for reading data from information pits on the information recording medium, and the clock is a read clock that is generated in the read channel unit. Therefore, stable tracking error signals can be generated at both of the inner and outer circumferences of the disc (information recording medium), by using sampling clocks corresponding to channel rates at the inner and outer circumferences of the disc.

According to a tenth aspect of the present invention, in the tracking error detection apparatus according to the ninth aspect, the clock control unit controls the second clock switching means so as to select either the clock for phase error detection or the frequency-divided clock of this clock, as the clock for low-band pass means, according to the frequency of the read clock that is generated in the read channel unit. Therefore, the clock for phase error detection is used as the clock for low-band pass means when the arithmetic time required for tracking error detection is relatively long, while its frequency-divided clock is used when the arithmetic time is relatively short, whereby power consumption can be reduced without degrading the tracking servo characteristics.

According to an eleventh aspect of the present invention, the tracking error detection apparatus according to the first aspect further includes a clock halt means for conducting ON/OFF of the operation clock for each processing means of the tracking error detection apparatus; wherein the clock control unit controls ON/OFF of the clock in accordance with the control cycle of tracking servo control. Therefore, each unit (each processing means) is operated only during the period for generating a tracking error signal that is required when performing tracking servo control, whereby power consumption is further reduced.

According to a twelfth aspect of the present invention, in the tracking error detection apparatus according to the eleventh aspect, the clock control unit controls a period of time during which the clock is to be halted, according to a change in the control cycle of tracking servo control. Therefore, each unit (each processing means) is operated only during the period for generating a tracking error signal that is required when performing tracking servo control, whereby power consumption is further reduced.

According to a thirteenth aspect of the present invention, in the tracking error detection apparatus according to the eleventh aspect, when the clock is a read clock generated in a read channel unit, the clock control unit controls a period of time during the clock is to be halted, according to the frequency of the read clock. Therefore, each unit (each processing means) is operated at a low operation rate, only during the period for generating a tracking error signal that is required when performing tracking servo control, whereby power consumption is further reduced.

According to a fourteenth aspect of the present invention, in the tracking error detection apparatus according to the eleventh aspect, the clock control unit controls a period of time during which the clock is to be halted, according to the rotation speed of the information recording medium. Therefore, each unit (each processing means) is operated at a low operation rate, only during the period for generating a tracking error signal that is required when performing tracking servo control, whereby power consumption is further reduced.

According to a fifteenth aspect of the present invention, in the tracking error detection apparatus according to the eleventh aspect, when no tracking servo control is carried out, the clock control unit halts the clock to be supplied to each processing means of the tracking error detection apparatus. Therefore, each unit (each processing means) is not operated when no tracking error signal is required, whereby power consumption is further reduced.

BRIEF DESCRIPTION OF THE DRAWINGS

FIGS. 4(a)–4(f) are conceptual diagrams for explaining the relationship between a servo control cycle and an operation cycle of a tracking error detection apparatus.

FIG. 5 is a block diagram illustrating a pickup in an optical recording/reproduction apparatus.

FIGS. 6(a)–6(c) are diagrams for explaining the relative positions of a light spot and an information pit (6(a)), a far field pattern (6(b)), and an output signal from a photoreceptor (6(c)).

FIGS. 7(a)–7(c) are diagrams for explaining the relative positions of a light spot and an information pit (7(a)), a far field pattern (7(b)), and an output signal from a photoreceptor (7(c)).

FIGS. 10(a)–10(h) are diagrams for explaining operation timings and waveforms of the circuit for generating a tracking error signal.

FIG. 11 is a diagram for explaining the relationship between the relative positions of a light spot and tracks, and a tracking error signal waveform.

DETAILED DESCRIPTION OF THE PREFERRED EMBODIMENTS

Embodiment 1

Hereinafter, a tracking error detection apparatus according to a first embodiment of the present invention will be described with reference to FIG. 1.

Figure 1:
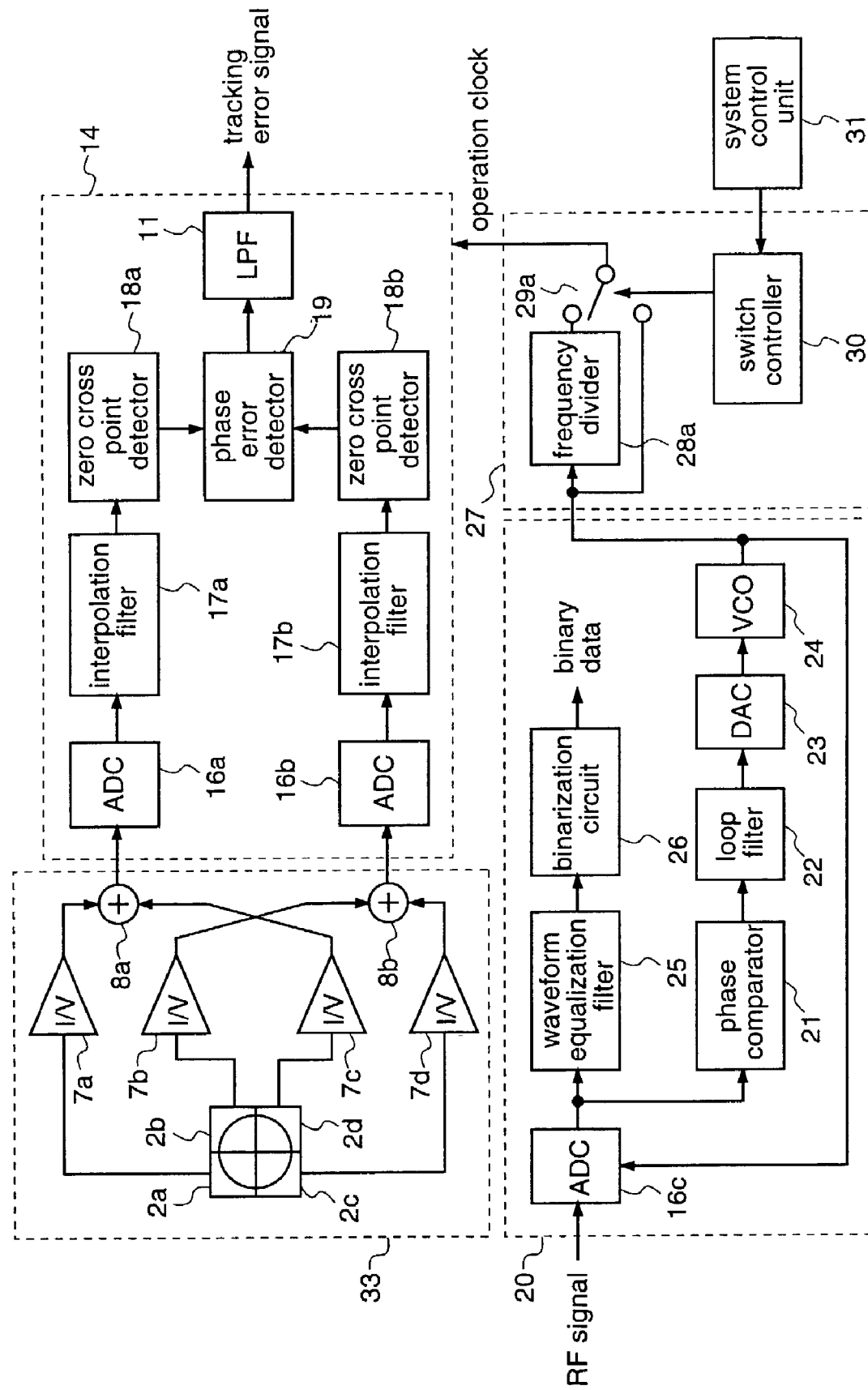
FIG. 1 is a block diagram illustrating a tracking error detection apparatus according to a first embodiment of the invention.

FIG. 1 is a block diagram illustrating a tracking error detection apparatus according to the first embodiment.

With reference to FIG. 1, the tracking error detection apparatus comprises an optical signal detection unit 33 including a photoreceptor 2, a tracking error detection unit 14, a read channel unit 20, a clock control unit 27, and a system control unit 31.

The optical signal detection unit 33 comprises a photoreceptor 2 which is divided into four elements 2a, 2b, 2c, and 2d, current-to-voltage converters 7a, 7b, 7c, and 7d, and adders 8a and 8b. The tracking error detection unit 14 comprises A/D converters 16a and 16b, interpolation filters 17a and 17b, zero cross point detectors 18a and 18b, a phase error detector 19 for calculating a phase error signal, and a low-pass filter (LPF)

11. The read channel unit 20 comprises an A/D converter 16c, a waveform equalization filter 25, a binarization circuit 26, a phase comparator 21, a loop filter 22, a D/A converter 23, and a voltage controlled oscillator (VCO) 24. The clock control unit 27 comprises a frequency divider 28a, a switch 29a, and a switch controller 30.

Next, a description will be given of the operation of the tracking error detection apparatus constructed as described above.

The photoreceptor 2 which is divided into four elements 2a, 2b, 2c, and 2d receives a reflected light beam that is obtained by applying a light spot onto a track on an information recording medium, and outputs photoelectric currents according to the amounts of light incident onto the respective photoreceptor elements 2a, 2b, 2c, and 2d. The photoelectric current outputs are converted into voltage signals by the current-to-voltage converters 7a, 7b, 7c, and 7d, respectively. Then, the adder 8a adds the outputs from the current-to-voltage converters 7a and 7c, and the adder 8b adds the outputs from the current-to-voltage converters 7b and 7d, thereby obtaining two sum signals for phase comparison, each sum signal corresponding to the diagonally arranged two photoreceptors. The two sum signals are digitized by the A/D converters (ADC) 16a and 16b, and the two sequences of digitized sampling data are filtered by the interpolation filters 17a and 17b, respectively, thereby obtaining interpolation (intermediate) data among the sampling data. As a preferable interpolation method, there is a method of obtaining data by Nyquist interpolation. Next, zero cross points at the rising or falling edges of the two interpolated data sequences are detected by the zero cross point detectors 18a and 18b. As a preferable method for detecting zero cross points, there is a method of detecting change points of signs (+→−, or −→+) in the interpolated data sequences. Next, the phase error detector 19 detects a phase difference from the distance between the corresponding zero cross points in the two interpolated waveforms.

Finally, the low-pass filter (LPF) 11 performs band restriction on the obtained phase error signal, and outputs a tracking error signal.

As an operation clock for the tracking error detection unit 14 for generating the tracking error signal, a read clock that is generated by the read channel unit 20 for reading data from the information pits on the information recording medium is employed.

In the read channel unit 20, the ADC 16c performs digitization of an RF signal for data reading, and outputs resultant sampling data to the waveform equalization filter 25. The waveform equalization filter 25 performs waveform equalization on the digitized sampling data, and the binarization circuit 26 detects the data recorded on the information recording medium, on the basis of the output from the waveform equalization filter 25. In order to perform sampling with an appropriate timing in the ADC 16c, a PLL (Phase Locked Loop) circuit is employed. In the PLL circuit shown in FIG. 1, the phase comparator 21 obtains a phase error signal from the sampling data outputted from the ADC 16c, and the phase error signal is filtered by the loop filter 22. Thereafter, the D/A converter (DAC) 23 converts the filtered phase error signal into an analog voltage signal to control the oscillation frequency of the voltage controlled oscillator (VCO) 24. An output signal from the VCO 24 is inputted to the ADC 16c to operate the ADC 16c, whereby the output signal serves as a read clock.

The clock control unit 27 controls the operations of the respective processing blocks of the tracking error detector 14, by using the clock generated in the read channel unit 20 or a frequency-divided clock generated in the frequency divider 28a.

Hereinafter, the frequency characteristics of signals recorded on an optical disc will be considered. For example, in the case of a CD, assuming that the channel clock frequency is T, information is recorded in a pit having a length of 3T~11T by the EFM (Eight to Fourteen Modulation) method, and the cycle of the shortest wavelength in the read waveform becomes 6T. According to the sampling theorem, when an input signal is sampled at a sampling rate T, reproduction is possible until the input signal frequency is ½T. That is, even when sampling is carried out with a clock (2T) having a frequency that is half the frequency of the channel clock, the input signal can be correctly reproduced. Accordingly, when using the clock (2T), the whole operation rate of the tracking error detection unit 14 can be reduced by half to suppress an increase in power consumption due to speedup of the drive. In FIG. 1, the tracking error detection unit 14 can reduce the operation rate by using the output from the frequency divider 28a, which is a frequency-divided clock of the read clock, resulting in reduced power consumption.

In the following description, a process of using the read clock generated in the read channel unit 20 as an operation clock is called a channel rate process, and a process of using a clock having a frequency that is half the frequency of the read clock, as an operation clock, is called a half rate process.

Initially, the half rate process will be described. When the operation rate is reduced by half, the arithmetic time required for tracking signal generation is increased, leading to an undesirable increase in the loop delay in the tracking servo system. The increased loop delay causes a degradation in tracking servo performance and, especially, the effect of this loop delay is considerable when the drive performs low-speed playback because the channel rate is low during the low-speed playback.

In order to solve the above-mentioned problem, the clock control unit 27 is constituted as follows. In the clock control unit 27, the switch 29a selects either the read clock which is generated in the read channel unit 20, or the frequency-divided clock of the read clock, which is generated in the frequency divider 28a, and supplies the clock to the tracking error detection unit 14. The switch controller 30, which is controlled by the system control unit 31 of the optical disc reproduction system, controls the switch 29a so that the switch 29a selects the read clock generated in the read channel unit 20 when performing low-speed playback where the channel rate is relatively low, and selects the frequency-divided clock generated in the frequency divider 28a when performing high-speed playback where the channel rate is relatively high, and supplies the clock to the tracking error detection unit 14. Thereby, power consumption can be reduced without degrading the tracking servo performance in both of the case where the disc rotation speed is high and the case where the disc rotation speed is low.

Furthermore, the high rotation speed is equivalent to that the frequency of the read clock in the read channel unit 20 is high, and the low rotation speed is equivalent to that the frequency of the read clock in the read channel unit 20 is low, that is, the clock control unit 27 can change the operation clock for tracking error detection, according to the frequency of the read clock in the read channel unit 20.

As described above, the tracking error detection apparatus according to the first embodiment is provided with the clock control unit having the frequency divider, the switch, and the switch controller, and the clock control unit supplies the read clock generated in the read channel unit, as an operation clock, to the tracking error detection unit having the phase error detector and the low-pass filter. Therefore, when the disc is rotated at a high speed, the output from the frequency divider is used as an operation clock for the tracking error detection unit, whereby the operation rate of the tracking error detection unit is reduced by half, resulting in a reduction in power consumption. Further, when the disc is rotated at a low speed, the read clock generated in the read channel unit is used as an operation clock for the tracking error detection unit, whereby the tracking servo characteristics are not degraded.

Embodiment 2

Hereinafter, a tracking error detection apparatus according to a second embodiment of the present invention will be described with reference to FIG. 2.

Figure 2:
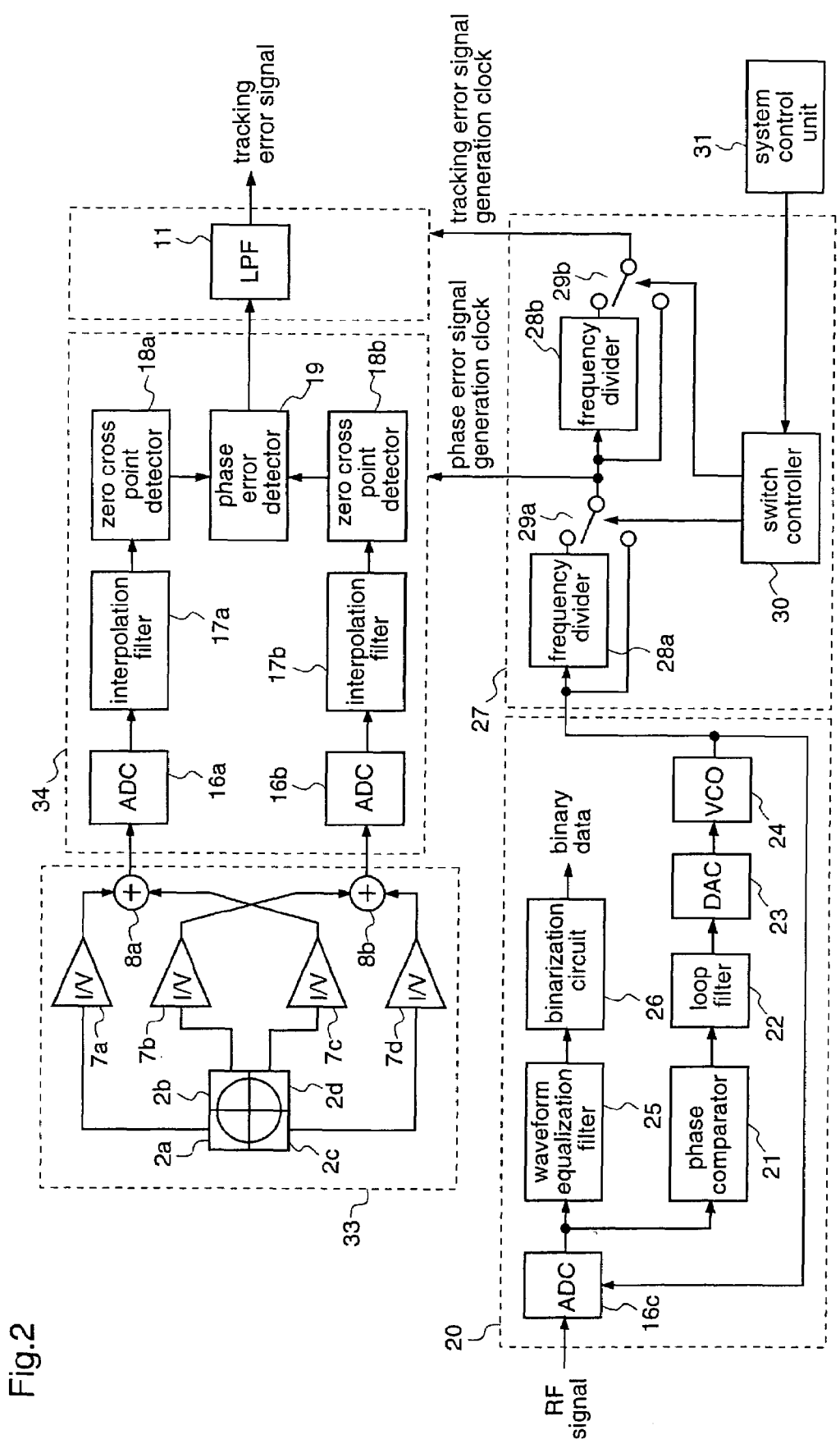
FIG. 2 is a block diagram illustrating a tracking error detection apparatus according to a second embodiment of the invention.

FIG. 2 is a block diagram illustrating the construction of a tracking error detection apparatus according to the second embodiment of the invention.

With reference to FIG. 2, the tracking error detection apparatus comprises an optical signal detection unit 33 including a photoreceptor, a phase error detection unit 34, a LPF 11, a read channel unit 20, a clock control unit 27, and a system control unit 31. Since the tracking error detection apparatus according to this second embodiment is identical to the apparatus according to the first embodiment except the construction of the clock control unit 27, the same constituents as those described for the first embodiment are given the same reference numerals to omit the description thereof.

The clock control unit 27 shown in FIG. 2 comprises a first-stage frequency divider 28a, a second-stage frequency divider 28b, switches 29a and 29b, and a switch controller 30.

Next, a description will be given of the operation of the tracking error detection apparatus according to the second embodiment, which is constructed as described above.

Since the operations of the optical signal detection unit 33, the phase error detection unit 34, the LPF 11, and the read channel unit 20 are identical to those already described for the first embodiment, repeated description is not necessary.

Hereinafter, the operation of the clock control unit 27 will be mainly described.

Although the LPF 11 performs band restriction on the phase error signal to make the phase error signal have a frequency band required for tracking servo control, since the control band for tracking servo control is sufficiently low with respect to the channel rate, a clock having a frequency that is sufficiently lower than the frequency of the read clock can be used as an operation clock for the LPF 11 to be used for tracking error signal generation.

Turning to FIG. 2, the phase difference detection unit 34 comprises ADCs 16a and 16b, interpolation filters 17a and 17b, zero cross point detectors 18a and 18b, and a phase error detector 19. The clock control unit 27 has a function of controlling an operation clock for the phase error detection unit 34 constructed as mentioned above (hereinafter referred to as a clock for phase error detection), and an operation clock for the LPF 11 that generates a tracking error signal (hereinafter referred to as a clock for low-pass means), separately from each other. The clock control unit 27 uses the clock that is frequency-divided by the frequency divider 28a as the clock for phase error detection, and uses the clock that is frequency-divided by the frequency divider 28b as the clock for low-pass means, whereby the operation rate of the LPF 11 other than the circuits required for generation of a phase error signal can be further reduced to suppress an increase in power consumption due to speedup of the drive.

However, when the frequency-divided clock of the clock for phase error detection is used as the clock for low-pass means, since the arithmetic time required for generation of a tracking error signal is increased due to the reduction in the operation rate of the LPF 11, the loop delay in the tracking servo system might be increased. The increased loop delay causes a degradation in tracking servo performance and, especially, the effect of this loop delay is considerable when the drive performs low-speed playback because the channel rate is low during the low-speed playback.

In order to solve the above-mentioned problem, the clock control unit 27 is constituted as follows. In the clock control unit 27, the switch 29b selects either the clock for phase error detection or the frequency-divided clock of the phase error detection clock, which is generated by the frequency divider 28b, and supplies the clock to the LPF 11. The switch controller 30, which is controlled by the system control unit 31 of the optical disc reproduction system, controls the switch 29b so that the switch 29b selects the phase error detection clock when performing low-speed playback where the channel rate is relatively low, and selects the frequency-divided clock generated in the frequency divider 28b when performing high-speed playback where the channel rate is relatively high, and supplies the clock to the LPF 11. Thereby, power consumption can be reduced according to the disc rotation speed (rpm) without degrading the tracking servo characteristics.

As described above, since the tracking error detection apparatus according to the second embodiment is provided with the clock control unit 27 having two stages of frequency dividers, the read clock generated in the read channel unit 20 can be used for phase error detection and for tracking error calculation, separately, so as to reduce the operation rate of the phase error detection unit 34 as well as the operation rate of the LPF 11 for tracking error calculation, whereby power consumption of the system can be reduced. Further, during the low-speed playback where the channel rate is low, the switch controller 30, which is controlled by the system control unit 31, controls the respective switches 29a and 29b so as to supply the read clock for phase error generation and the phase error generation clock for tracking error signal generation, respectively, thereby preventing the tracking servo characteristics from being degraded.

Embodiment 3

Hereinafter, a tracking error detection apparatus according to a third embodiment of the present invention will be described with reference to FIGS. 3 and 4(a)–(f).

Figure 3:
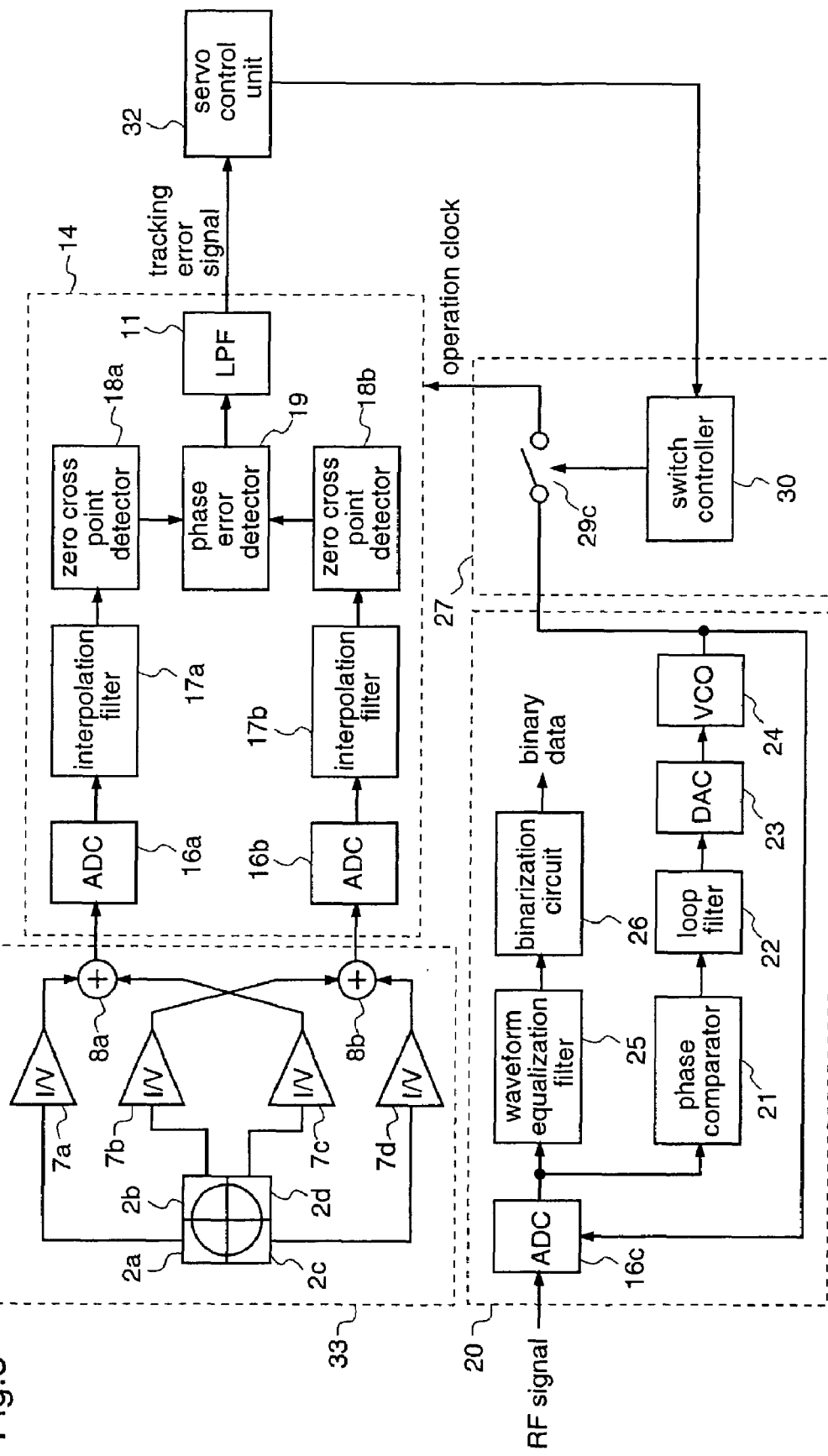
FIG. 3 is a block diagram illustrating a tracking error detection apparatus according to a third embodiment of the invention.
Figure 8A:
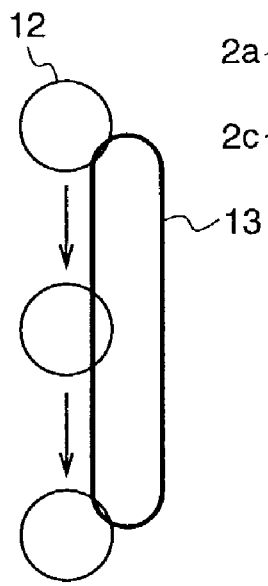
FIGS. 8(a)–8(c) are diagrams for explaining the relative positions of a light spot and an information pit (8(a)), a far field pattern (8(b)), and an output signal from a photoreceptor (8(c)).
Figure 8B:
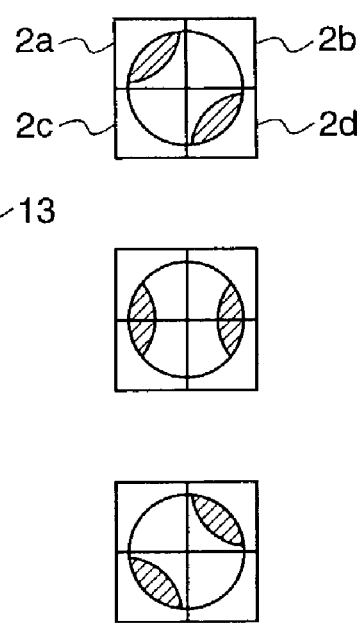
Figure 8C:
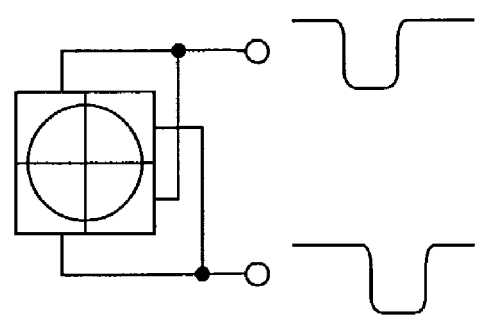
Figure 9:
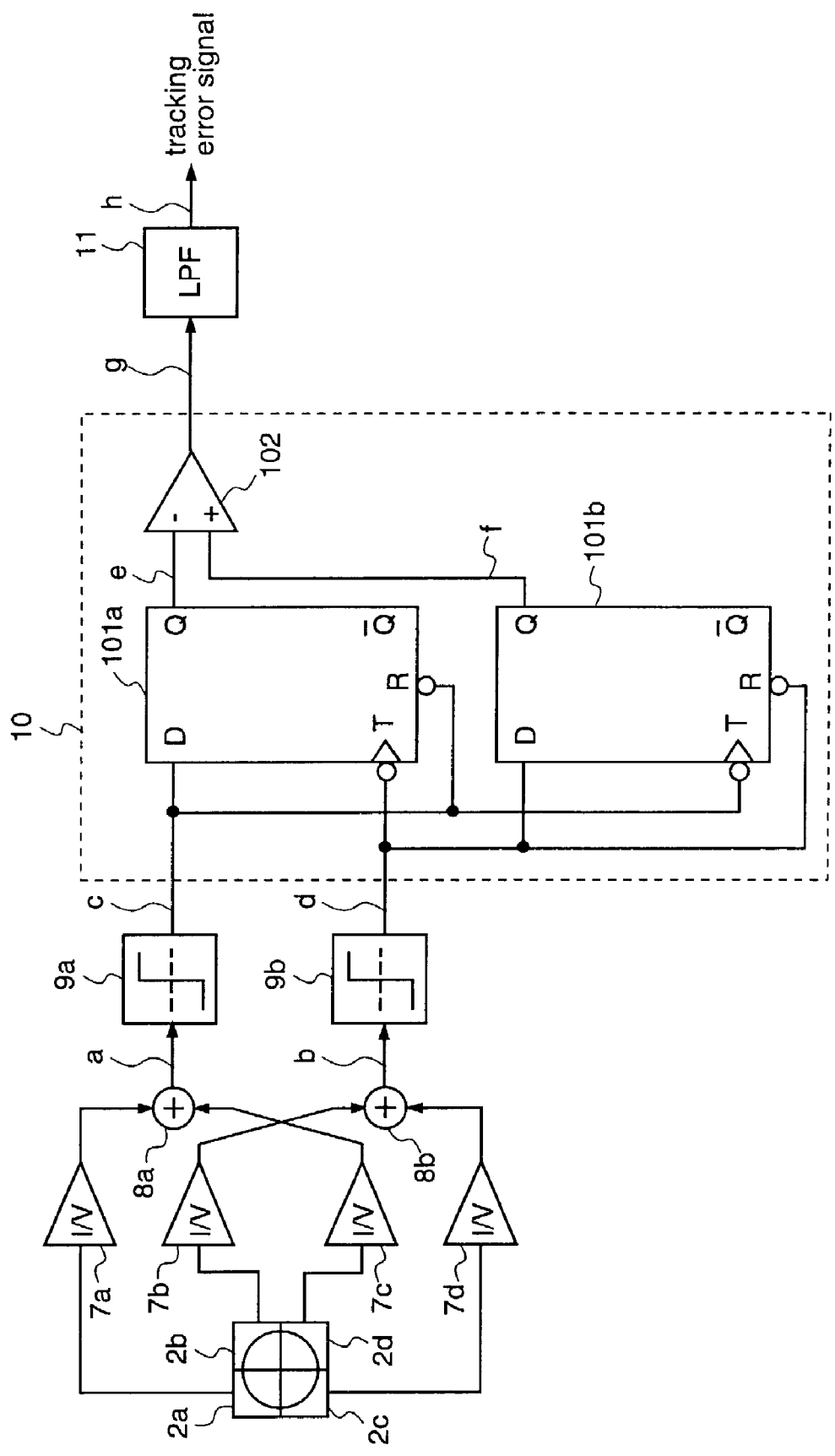
FIG. 9 is a block diagram illustrating a circuit for generating a tracking error signal by a conventional analog method.
Figure 12:
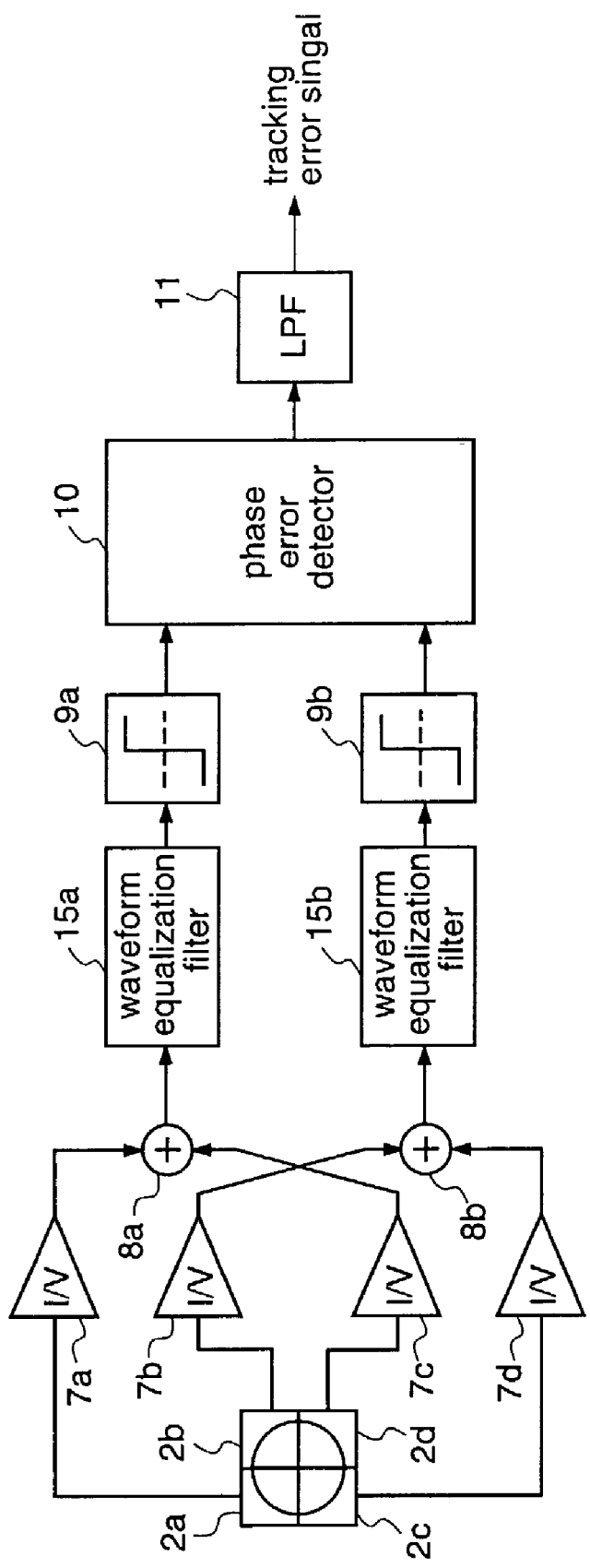
FIG. 12 is a block diagram illustrating a circuit for compensating an amplitude degradation in a high-frequency band, in a conventional analog system tracking error signal generation apparatus.
Figure 13:
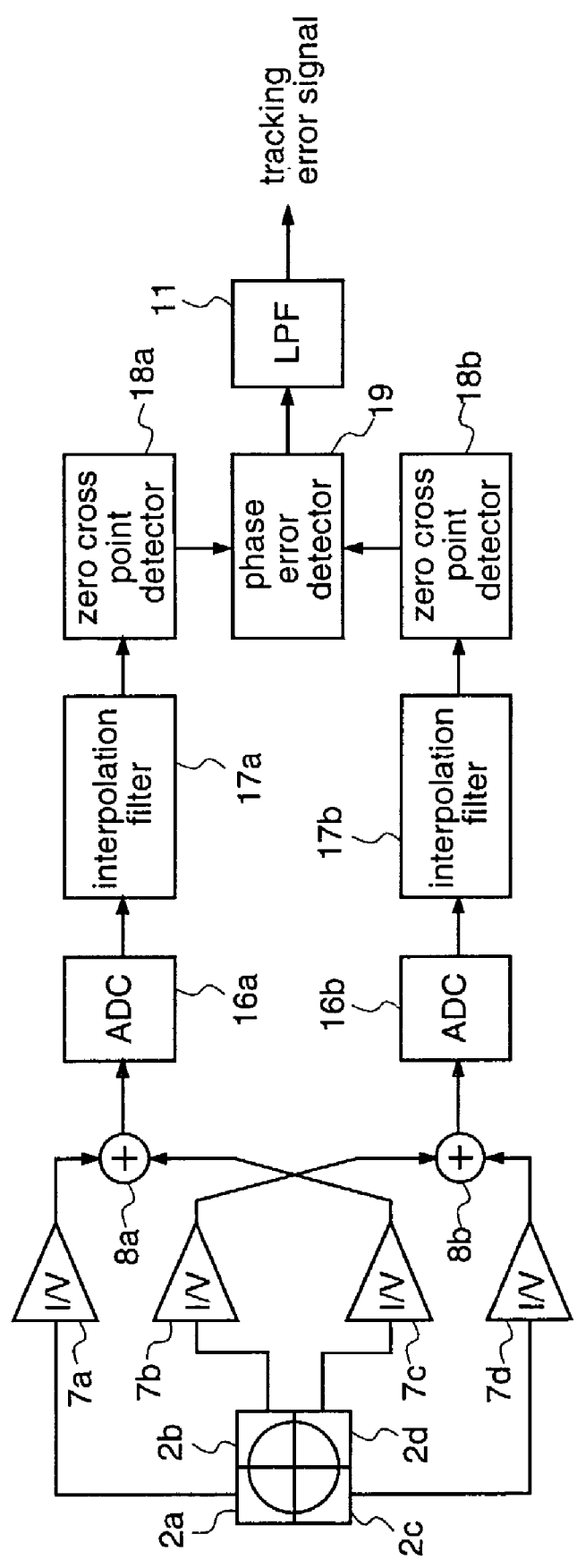
FIG. 13 is a block diagram illustrating a conventional digital system tracking error detection apparatus.
Figure 14:
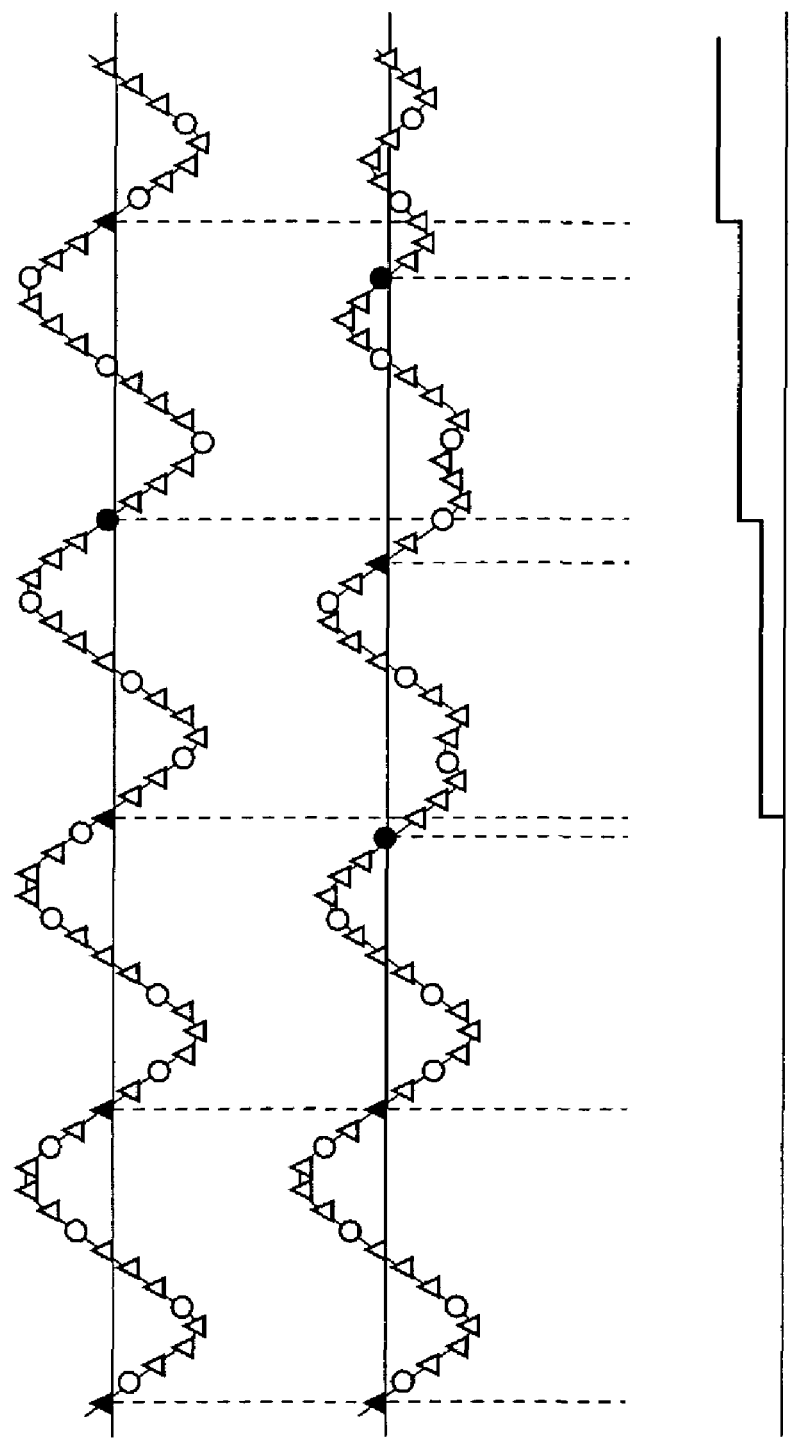
FIGS. 14(a)–14(c) are diagrams for explaining phase error detection by the conventional digital system tracking error detection apparatus.
Figure 15:
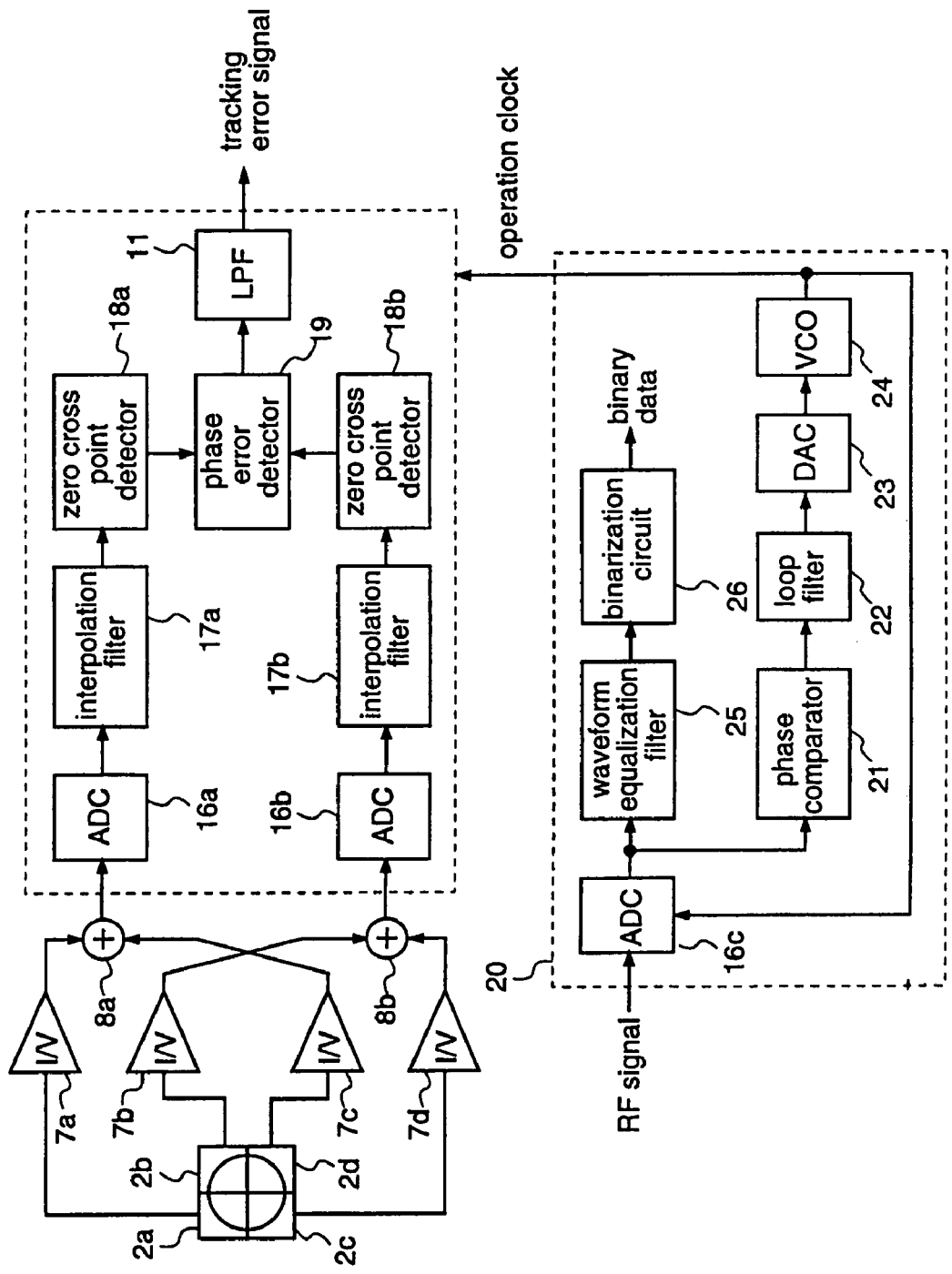
FIG. 15 is a block diagram illustrating a conventional digital system tracking error detection apparatus which is adapted to CAV reproduction.

FIG. 3 is a block diagram illustrating the construction of a tracking error detection apparatus according to the third embodiment.

In FIG. 3, the tracking error detection apparatus comprises an optical signal detection unit 33 including a photoreceptor, a tracking error detection unit 14, a read channel unit 20, a clock control unit 27, and a servo control unit 32. Since the tracking error detection apparatus according to this third embodiment is identical to the apparatus according to the first embodiment except the construction of the clock control unit 27 and the servo control unit 32, the same constituents as those described for the first embodiment are given the same reference numerals to omit the description thereof.

The clock control unit 27 comprises a switch 29c and a switch controller 30.

Next, a description will be given of the operation of the tracking error detection apparatus according to the third embodiment, which is constructed as described above.

Since the operations of the optical signal detection unit 33, the tracking error detection unit 14, and the read channel unit 20 are identical to those already described for the first embodiment, repeated description is not necessary. Hereinafter, the operation of the clock control unit 27 will be mainly described.

A tracking error signal generated by the LPF 11 is used for tracking servo processing in the servo control unit 32. As shown in FIGS. 4(a)–(f), since the servo control unit 32 captures a tracking error signal for every cycle of tracking servo control, it is not necessary to continuously calculate the tracking error signal. Accordingly, the operation of the tracking error detection apparatus can be halted all the time except a period required for calculation of the tracking error signal.

With reference to FIG. 3, in the clock control unit 27, the clock for generating a tracking error signal can be turned on or off by the switch 29c. The switch controller 30, which is controlled by the servo control unit 32, operates the tracking error detection unit 14 only during a period of time required for generation of the tracking error signal as shown in FIGS. 4(a)–(f), and halts the clock during all other times, whereby power consumption can be reduced.

For example, the case where the speed of the drive changes will be considered. When the speed of the drive is increased, the channel rate becomes high, while the tracking servo cycle is constant and the number of arithmetic cycles required for generation of a tracking error signal is predetermined. Therefore, as shown in FIGS. 4(a)–(f), the tracking error detection unit 14 can be operated only during a required period of time according to the speed of the drive by controlling the switching signal used for halting the clock in accordance with the speed of the drive, whereby power consumption can be reduced.

Further, the clock control unit 27 can halt the operation of the tracking error detection unit 14 during a period when no tracking servo is carried out, to reduce power consumption.

As described above, in the tracking error detection apparatus according to the third embodiment, the switch controller 30, which is controlled by the control signal from the servo control unit 32, operates the tracking error detection unit 14 only during a period of time required for generation of track error signals, and halts the clock during all other times, whereby power consumption is further reduced.

When the control signal from the servo control unit 32 according to the third embodiment is inputted to the clock control unit 27 according to the first or second embodiment, further reduction in power consumption can be achieved. That is, the respective processing units for tracking error detection are operated at a low operation rate only during a period of time required for generation of tracking error signals, and the operation is halted during all other times, whereby power consumption is further reduced.

What is claimed is:

1. A tracking error detection apparatus comprising:
   a phase error detection unit operable to detect a phase error of an output signal according to an amount of reflected light that is obtained when a light beam is applied to an information recording medium;
   a low-band pass filter unit operable to perform band restriction to obtain a tracking error signal from a phase error signal of the phase error detection unit;
   a clock generation unit operable to generate a clock and a clock control unit having a first frequency division unit operable to generate a frequency-divided clock from the clock that is generated by the clock generation unit, a first clock switching unit operable to select either the clock that is generated by the clock generation unit or the frequency-divided clock, as a clock for phase error detection which is to be supplied to the phase error detection unit a second frequency division unit operable to generate a frequency-divided clock from the clock for phase error detection, and a second clock switching unit operable to select either the clock for phase error detection or the frequency-divided clock generated from the clock for phase error detection, as a clock for low-band pass filter unit which is to be supplied to the low-band pass filter unit.

2. A tracking error detection apparatus as defined in claim 1, wherein the clock control unit controls the second clock switching unit so as to select either the clock for phase error detection or the frequency-divided clock of the clock for phase error detection, as the clock for low-band pass filter unit, according to a rotation speed of the information recording medium.

3. A tracking error detection apparatus as defined in claim 1, wherein the clock generation unit further includes a read channel unit for reading data from information pits on the information recording medium, and the clock is a read clock that is generated in the read channel unit.

4. A tracking error detection apparatus as defined in claim 3, wherein the clock control unit controls the second clock switching unit so as to select either the clock for phase error detection or the frequency-divided clock of the clock for phase error detection, as the clock for low-band pass filter unit, according to a frequency of the read clock that is generated in the read channel unit.

5. A tracking error detection apparatus comprising:
   a phase error detection unit operable to detect a phase error of an output signal according to an amount of reflected light that is obtained when a light beam is applied to an information recording medium;
   a low-band pass filter unit operable to perform band restriction to obtain a tracking error signal from a phase error signal outputted from the phase error detection unit;
   a clock generation unit operable to generate a clock;
   a clock control unit having a frequency division unit operable to generate a frequency-divided clock from the clock that is generated by the clock generation unit, and operable to control the frequency-divided clock so that the clock is usable as operation clocks for the tracking error detection apparatus; and
   a clock halt unit operable to conduct ON/OFF of the operation clocks of the respective processing units of the tracking error detection apparatus,
   wherein, when the clock is a read clock generated in a read channel unit operable to read data from information pits on the information recording medium, the clock control unit controls a period of time during which the clock is to be halted, according to a frequency of the read clock generated in the read channel unit.

* * * * *